United States Patent Office 2,824,140
Patented Feb. 18, 1958

2,824,140

PRODUCTION OF HIGH-MOLECULAR-WEIGHT KETONES

James H. Gardner, Weston, Mass., assignor, by mesne assignments, to Escambia Chemical Corporation, Pace, Fla., a corporation of Delaware No Drawing. Application February 1, 1956
Serial No. 562,665

9 Claims. (Cl. 260—597)

This invention relates to the production of chemicals and in particular to the production of high-molecular-weight ketones.

A principal object of the present invention is to provide a process for producing high-molecular-weight ketones by the polymerization of ethylene in the presence of acetaldehyde and elemental oxygen.

Another object of the invention is to produce novel high-molecular-weight ketones.

Other objects of the invention will in part be obvious and will in part appear hereinafter.

The invention accordingly comprises the process involving the several steps and the relation and the order of one or more of such steps with respect to each of the others, and the product possessing the features, properties and relation of components which are exemplified in the following detailed disclosure, and the scope of the application of which will be indicated in the claims.

For a fuller understanding of the nature and objects of the invention, reference should be had to the following detailed description.

It is now well known that ethylene can be polymerized at very high pressures to produce high-molecular-weight polymers. It has also been shown that ethylene will react with saturated aldehydes in the presence of a peroxide-type catalyst (e. g., benzoyl peroxide) at ethylene pressures above 200 atmospheres to produce polymeric materials. This latter type reaction, described in U. S. Patent 2,402,137, is often referred to as telomerization. This process requires substantial amounts of expensive catalytic material since it is consumed during the reaction. More recently it has been shown that a low-temperature, low-pressure reaction of ethylene and a saturated aldehyde will produce definite low-molecular-weight ketones. In the present invention, high-molecular-weight ketones, ranging in character from liquids to solids at room temperature, are produced by a low-temperature, relatively low-pressure polymerization of ethylene in the presence of acetaldehyde and elemental oxygen.

The polymerization of the present invention is preferably achieved by reacting ethylene with substantial quantities of acetaldehyde and elemental oxygen at temperatures below about 100° C. and at ethylene partial pressures of between about 500 p. s. i. and about 5000 p. s. i. This reaction may be carried out either in the presence or absence of suitable organic solvents. It has been found that, when the polymerization of ethylene is carried out under the above conditions, there are obtained polymeric materials containing, on the average, at least one carbonyl group per molecule of polymer. These polymeric materials may also contain smaller amounts of other oxygenated functional groups such as ester linkages, carboxy groups and ether linkages. These polymeric materials are, however, predominately ketones. The carbonyl groups in the polymeric materials are, for the most part, present as a part of acetyl groups ($CH_3C=O$) which are derived from the acetaldehyde.

The high-molecular-weight ketones produced by the present invention have considerable utility. For example, they may be reduced to yield secondary alcohol products which find use as detergent intermediates, as shown in Canadian Patent 515,506.

Specific detailed methods of practicing the present invention are set forth in the following non-limiting examples.

Example I 675 cc. of acetaldehyde were charged to a reactor at room temperature (25° C.) with a volume of about 0.1 cubic foot. The reactor was sealed and equal volumes of nitrogen and ethylene were fed to the reactor to bring the total pressure up to about 3000 p. s. i. The ethylene partial pressure was about 1500 p. s. i. Ethylene was fed to the reactor at a rate of about 4 standard cubic feet per hour, along with a steady rate of air feed also of about 4 standard cubic feet per hour. The ethylene feed rate was such as to maintain the ethylene partial pressure on the order of about 1500 p. s. i. throughout the reaction. During the run, the temperature rose from 25° C., at which temperature the reaction commenced readily, to a temperature of about 55° C. The average temperature of the run was about 40° C. After 2 hours, the run was terminated and the liquid polymeric materials formed were recovered. The above run produced about 117 grams of liquid polymeric oxygenated material per standard cubic foot of oxygen fed. This polymeric material, with an average molecular weight on the order of about 248, was found to contain about 73 percent carbon, 12 percent hydrogen and 15 percent oxygen. This polymeric material had a functionality of $4.4\times10^{-3}$ equivalents per gram of carbonyl, $1.15\times10^{-3}$ equivalents per gram of ester, and $0.25\times10^{-3}$ equivalent per gram of acid. This polymeric material contained, on the average, at least one carbonyl group per molecule of polymer.

Example II

This run was carried out under essentially the same conditions (of ethylene partial pressure, ethylene and air feed rates, etc.) as were present in Example I, except that during the run the temperature rose from 25° C., at which temperature the reaction was initiated, to a temperature of about 70° C. The average temperature of the run was about 50° C. This run produced about 64.5 grams of polymeric oxygenated material per standard cubic foot of oxygen fed. The liquid polymeric material obtained from this run had an average molecular weight on the order of about 182 and contained about 72 percent carbon, 12 percent hydrogen and 16 percent oxygen. This liquid polymeric material had a functionality of $6.4\times10^{-3}$ equivalents per gram of carbonyl, $1.35\times10^{-3}$ equivalents per gram of ester and $0.2\times10^{-3}$ equivalent per gram of acid. This liquid polymeric material contained, on the average, at least one carbonyl group per molecule of polymer.

Example III

This run was carried out under essentially the conditions (of ethylene and air feed rates, duration of run, etc.) as were present in Example I, except that the ethylene partial pressure was maintained on the order of about 1000 p. s. i. and the average temperature of the reaction was about 70° C. This run produced about 10 grams of liquid polymeric oxygenated material per standard cubic foot of oxygen fed. The liquid polymeric material obtained from this run had an average molecular weight on the order of about 214 and contained about 79.4 percent carbon, 11.6 percent hydrogen and 13.5 percent oxygen. This liquid polymeric material had a functionality of $5.41\times10^{-3}$ equivalents per gram of carbonyl, $0.12 \times 10^{-3}$ equivalent per gram of ester and $0.02 \times 10^{-3}$ equivalent per gram of acid. This polymeric material contained, on the average, at least one carbonyl group per molecule of polymer.

*Example IV*

The organic solvent, 500 cc. of benzene, 1.4 grams of manganese propionate catalyst and 250 cc. of acetaldehyde were charged to a high-pressure reactor with a volume of about 0.1 cubic foot. The reactor was sealed and equal volumes of ethylene and nitrogen were charged to the reactor to bring the total pressure up to about 2000 p. s. i. The ethylene partial pressure was about 1000 p. s. i. Ethylene was fed to the reactor at a rate of about 4 standard cubic feet per hour, along with a steady rate of air feed also of about 4 standard cubic feet per hour. The ethylene feed rate was such as to maintain the ethylene partial pressure on the order of about 1000 p. s. i. throughout the reaction. The average temperature of the run was about 60° C. After 2 hours, the run was terminated and the liquid polymeric materials formed were recovered. The above run produced about 77.5 grams of liquid polymeric oxygenated material per standard cubic foot of oxygen fed. This liquid polymeric material, with an average molecular weight of about 204, was found to contain about 73 percent carbon, 12 percent hydrogen and 15 percent oxygen. This polymeric material had a functionality of $5.0 \times 10^{-3}$ equivalents per gram of carbonyl, $0.5 \times 10^{-3}$ equivalent per gram of ester and $0.2 \times 10^{-3}$ equivalent per gram of acid. This polymeric material contained, on the average, at least one carbonyl group per molecule of polymer.

*Example V*

This run was carried out under essentially the same conditions of ethylene partial pressure, ethylene and air feed rates, etc., as were present in Example IV, except that the average temperature of the reaction was about 85° C. This run produced about 80 grams of polymeric oxygenated material per standard cubic foot of oxygen fed. The polymeric material obtained consisted of a liquid portion and a solid portion in a ratio of about 27 to 1. The liquid portion had an average molecular weight of about 285 and contained about 75 percent carbon, 12 percent hydrogen and 13 percent oxygen. This liquid polymeric material had a functionality of $5.2 \times 10^{-3}$ equivalents per gram of carbonyl, $0.9 \times 10^{-3}$ equivalent per gram of ester and $0.3 \times 10^{-3}$ equivalent per gram of acid. This liquid polymeric material contained, on the average, at least one carbonyl group per molecule of polymer. The solid portion had an average molecular weight on the order of about 350 and contained about 75 percent carbon, 13 percent hydrogen and 12 percent oxygen. This solid polymeric material had a functionality of about $3.5 \times 10^{-3}$ equivalents per gram of carbonyl.

The presence of acetaldehyde permits the oxidative polymerization of ethylene to proceed at temperatures far below those at which ethylene alone will react. The low-temperature oxidative polymerization of ethylene minimizes degradative oxidation of the formed polymeric material and chain branching. The formation of straight chains of polymer is suggested by the production in Example V of a relatively low-molecular-weight solid polymeric material. Additionally, the presence of acetaldehyde in the low-temperature reaction permits the production of novel polymeric materials which are more uniform in their composition. These polymers, which may range in character from liquids to solids, contain, in addition to ethylene residues, oxygenated functional groups such as carbonyl and carboxy groups and ester and ether linkages. The polymeric material contains, on the average, at least one carbonyl group per molecule. The polymeric material additionally contains some ether linkages and the higher-molecular-weight polymers contain, on the average, at least one ether linkage per molecule. The average molecular weight of the polymeric material has been found to be consistently above 175.

The carbonyl groups constitute the major portion or percentage of the functionality in the polymeric material. Due to the regular recurrence of a predominance or prevalence of carbonyl groups, these polymeric materials have been characterized as high-molecular-weight ketones. The carbonyl groups in the high-molecular-weight ketones are, for the most part, present as part of acetyl groups ($CH_3C=O$) which are derived from the acetaldehyde. These ketones contain, on the average, at least one acetyl (methyl carbonyl) group per polymer molecule. The ketones of the present invention may thus be considered as being essentially methyl ketones having a long hydrocarbon chain which may contain additional oxygenated functional groups, predominantly ether links.

While several limited examples of the present invention have been illustrated above, it should be pointed out that numerous modifications may be made without departing from the scope of the invention. As illustrated in the examples, the reaction may be carried out either in the presence or absence of suitable organic solvents to produce substantially similar high-molecular-weight ketones. When organic solvents are employed, it is preferred that the solvent be relatively inert to oxygen and acetaldehyde at reaction temperatures and that it not be consumed during the reaction. In addition to the use of the preferred solvent, benzene, numerous other solvents can also be employed in the reaction. Examples of suitable solvents are diphenyl, paraffin hydrocarbons not containing a teritary hydrocarbon and the like.

With regard to the pressure, it should be pointed out that it is maintained at ethylene partial pressures above 500 p. s. i. and preferably between about 500 p. s. i. and 5000 p. s. i. Ethylene is, therefore, introduced or fed to the reactor at a rate such as to maintain the desired ethylene partial pressure within the reactor relatively constant throughout the reaction. It is evident that this rate, which may vary somewhat during the reaction, will be such as to make up for the loss of ethylene in the purge gas and for that which has reacted.

The elemental oxygen employed in the reaction may be considered as a reactant, since appreciable quantities of oxygenated functional groups other than acetyl groups appear in the polymeric ketone molecules. The quantity of elemental oxygen, as also the ethylene desired to be introduced into the reactor, may be expressed in terms of unit rate of feed per unit of time per unit of reactor volume. The elemental oxygen is thus preferably continuously introduced or fed to the reactor at a rate of at least one standard cubic foot per hour per cubic foot of reactor. Rates of between about 1 to about 25 standard cubic feet per hour of elemental oxygen per cubic foot of reactor are most suitable for the reaction. These rates are, however, such that the total amount of elemental oxygen fed during the reaction is in excess of 10 percent by weight of the acetaldehyde fed during the reaction. This generalization is applicable whether the reaction is carried out batchwise or in a continuous manner. However, when the reaction is carried out continuously, the quantity of elemental oxygen being fed is maintained in excess of 10 percent by weight of the acetaldehyde also continuously being fed to the reaction. The elemental oxygen may be derived either from pure oxygen or from elemental-oxygen-containing gases such as air.

The quantity of acetaldehyde present during the oxidative polymerization of ethylene may be varied considerably, as shown in the examples. However, it is preferable that there be employed a quantity of acetaldehyde such that there can be at least one acetyl group incorporated in each molecule of polymeric material formed. The desired quantities of acetaldehyde may be used in the presence of an organic solvent, such as illustrated in Examples IV and V, or used in such quantities as to be the sole initial liquid medium in the reactor, as illustrated in Examples I, II and III.

The reaction is preferably carried out at relatively low temperatures and in particular at temperatures below about 100° C. The process may be carried out either on a batch scale or in a continuous manner.

Since certain changes may be made in the above process and product without departing from the scope of the invention herein involved, it is intended that all matter contained in the above description shall be interpreted as illustrative and not in a limiting sense.

What is claimed is:

1. A process for the production of high-molecular-weight ketones which comprises reacting ethylene in a reactor at temperatures between about room temperature and 100° C. with acetaldehyde and elemental oxygen, there being present during the reaction a quantity of acetaldehyde sufficient to form high-molecular-weight ketones containing on the average at least one acetyl group per molecule, introducing ethylene into said reactor at a rate to maintain therein ethylene partial pressures between about 500 p. s. i. and 5000 p. s. i., continuously introducing elemental oxygen at a rate of at least one standard cubic foot per hour per cubic foot of reactor, and recovering high-molecular-weight ketones.

2. A process for the production of high-molecular-weight ketones which comprises reacting ethylene, acetaldehyde and elemental oxygen at temperatures between about room temperature and 100° C. and at ethylene partial pressures between about 500 p. s. i. and 5000 p. s. i., there being present during the reaction a quantity of acetaldehyde sufficient to form high-molecular-weight ketones containing, on the average, at least one acetyl group, the quantity of elemental oxygen fed during the reaction being in excess of 10 percent by weight of the acetaldehyde fed during the reaction, and recovering from the reaction high-molecular-weight ketones.

3. The process of claim 1 wherein said reaction is carried out in an inert organic solvent.

4. The process of claim 3 wherein said organic solvent is benzene.

5. A process for the production of high-molecular-weight ketones which comprises reacting ethylene in a reactor at temperatures between about room temperature and 100° C. with acetaldehyde and elemental oxygen, there being present during the reaction a quantity of acetaldehdye sufficient to form high-molecular-weight ketones containing on the average at least one acetyl group per molecule, introducing ethylene into said reactor at a rate to maintain therein ethylene partial pressures of between about 500 p. s. i. and 5000 p. s. i., continuously introducing elemental oxygen at a rate of between about one and twenty five standard cubic feet per hour per cubic foot of reactor, and recovering high-molecular-weight ketones.

6. The process of claim 5 wherein said reaction is carried out in an organic solvent.

7. The process of claim 6 wherein said organic solvent is benzene.

8. A process for the production of high-molecular-weight ketones which comprises reacting ethylene in a reactor at temperatures between about room temperature and 100° C. with acetaldehyde and elemental oxygen, there being present during the reaction a quantity of acetaldehyde sufficient to form high-molecular-weight ketones containing on the average at least one acetyl group per molecule, introducing ethylene into said reactor at a rate to maintain therein ethylene partial pressures of between about 1000 p. s. i. and 1500 p. s. i., continuously introducing elemental oxygen at a rate of between about one and twenty five standard cubic feet per hour per cubic foot of reactor, and recovering high-molecular-weight ketones.

9. A process for the production of high-molecular-weight ketones which comprises reacting ethylene in a reactor at temperatures between about room temperature and 100° C. with acetaldehyde and elemental oxygen, there being present during the reaction a quantity of acetaldehyde sufficient to form high-molecular-weight ketones containing on the average at least one acetyl group per molecule, introducing ethylene into said reactor at a rate to maintain therein ethylene partial pressures of between about 1000 p. s. i. and 1500 p. s. i., continuously introducing elemental oxygen at a rate of about 8 standard cubic feet per hour per cubic foot of reactor, and recovering high-molecular-weight ketones.

References Cited in the file of this patent

UNITED STATES PATENTS

| | | |
|---|---|---|
| 2,398,426 | Hanford | Apr. 16, 1946 |
| 2,432,287 | Cramer | Dec. 9, 1947 |
| 2,440,801 | Hanford et al. | May 4, 1948 |
| 2,517,732 | Stiteler et al. | Aug. 8, 1950 |
| 2,647,918 | Patrick | Aug. 4, 1953 |
| 2,647,919 | Patrick | Aug. 4, 1953 |